(12) United States Patent
Lortz et al.

(10) Patent No.: US 7,615,577 B2
(45) Date of Patent: Nov. 10, 2009

(54) HIGHLY FILLED DISPERSION CONTAINING TRANSITION ALUMINIUM OXIDE

(75) Inventors: Wolfgang Lortz, Waechtersbach (DE); Heinz Lach, Rodenbach (DE); Joachim Von Seyerl, Seeon (DE)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 12/097,300

(22) PCT Filed: Dec. 7, 2006

(86) PCT No.: PCT/EP2006/069424
§ 371 (c)(1), (2), (4) Date: Jun. 13, 2008

(87) PCT Pub. No.: WO2007/068646
PCT Pub. Date: Jun. 21, 2007

(65) Prior Publication Data
US 2008/0312067 A1 Dec. 18, 2008

(30) Foreign Application Priority Data
Dec. 15, 2005 (DE) .................. 10 2005 059 960

(51) Int. Cl.
*C01F 7/02* (2006.01)
*B01F 17/52* (2006.01)
(52) U.S. Cl. .................. 516/90; 423/625; 501/153
(58) Field of Classification Search .................. 516/90; 423/625; 501/153
See application file for complete search history.

(56) References Cited

U.S. PATENT DOCUMENTS

| | | | |
|---|---|---|---|
| 6,123,912 A * | 9/2000 | Wei et al. | .................. 423/625 |
| 6,663,683 B2 | 12/2003 | Lortz et al. | |
| 6,676,719 B2 | 1/2004 | Lortz et al. | |
| 6,767,377 B2 | 7/2004 | Schumacher et al. | |
| 6,808,769 B2 | 10/2004 | Batz-Sohn et al. | |
| 6,991,190 B2 | 1/2006 | Lortz et al. | |
| 7,015,270 B2 | 3/2006 | Scharfe et al. | |
| 7,169,322 B2 | 1/2007 | Menzel et al. | |
| 7,374,787 B2 | 5/2008 | Lortz et al. | |
| 7,470,423 B2 | 12/2008 | Lortz et al. | |
| 2002/0123565 A1 * | 9/2002 | Schultes et al. | .................. 525/50 |
| 2004/0097362 A1 | 5/2004 | Addiego | |
| 2004/0240062 A1 | 12/2004 | Lortz et al. | |
| 2005/0169861 A1 | 8/2005 | Lortz et al. | |
| 2006/0104881 A1 | 5/2006 | Lortz et al. | |
| 2006/0163533 A1 | 7/2006 | Batz-Sohn et al. | |
| 2006/0193764 A1 | 8/2006 | Katusic et al. | |
| 2007/0048205 A1 | 3/2007 | Katusic et al. | |
| 2008/0051473 A1 | 2/2008 | Lortz et al. | |
| 2008/0098932 A1 | 5/2008 | Perlet et al. | |
| 2008/0264299 A1 | 10/2008 | Lortz et al. | |
| 2008/0312065 A1 * | 12/2008 | Oswald et al. | .................. 501/134 |

FOREIGN PATENT DOCUMENTS

| DE | 196 03 584 | 8/1996 |
|---|---|---|
| DE | 19603584 A1 * | 8/1996 |

OTHER PUBLICATIONS

Shi et al. "Compaction and Sintering Behavior of Bimodal Alumina Powder Suspensions by Pressure Filtration", J of the American Ceramic Society, Apr. 2000, vol. 83, No. 4, pp. 737-742.*
U.S. Appl. No. 60/405,739, filed Aug. 26, 2002, Lortz, et al.
U.S. Appl. No. 11/722,122, filed Jun. 19, 2007, Oswald, et al.
U.S. Appl. No. 12/097,300, filed Jun. 13, 2008, Lortz, et al.
U.S. Appl. No. 11/910,668, filed Mar. 8, 2006, Kroll, et al.
U.S. Appl. No. 60/708,401, filed Aug. 16, 2005, Katusic, et al.
U.S. Appl. No. 60/940,908, filed May 30, 2007, Kroell, et al.
U.S. Appl. No. 12/271,414, filed Nov. 14, 2008, Wursche, et al.
Smith, P.A. et al., "Effect of Particle Packing on the filtration and Rheology Behavior of Extended Size Distribution Alumina Suspensions", Journal of the American Chemical Society, vol. 78, No, 1, pp. 1737-1744, XP-002345227, (1995).
Shi, J-L. et al., "Compaction and Sintering Behavior of Bimodal Alumina Powder Suspensions by Pressure Filtration" Journal of the American Ceramic Society, vol. 83, No. 4, pp. 737-742, XP-000923793, (2000).

* cited by examiner

*Primary Examiner*—Ling-Siu Choi
*Assistant Examiner*—Chun-Cheng Wang
(74) *Attorney, Agent, or Firm*—Oblon, Spivak, McClelland, Maier & Neustadt, L.L.P.

(57) ABSTRACT

Aqueous dispersion containing transition aluminium oxide as only solid and a dispersant, in which—the transition aluminium oxide is present in the form of aggregates of primary particles, the content of transition aluminium oxide in the dispersion is from 40 to 65% by weight, the aggregates in the dispersion have a mean aggregate diameter of less than 100 nm,—the dispersant contains polyaluminium hydroxychloride, polyaluminium hydroxynitrate and/or polyaluminium hydroxysulphate, the dispersion has a pH of from 3 to 5.

16 Claims, No Drawings

HIGHLY FILLED DISPERSION CONTAINING TRANSITION ALUMINIUM OXIDE

The invention relates to a dispersion of transition aluminium oxide, its production and use.

It is known that ceramic bodies can be produced by means of highly filled metal oxide dispersions. The requirements which the dispersion has to meet comprise mainly a low viscosity and a high degree of fill in order to minimize shrinkage and cracks in thermal treatment steps. It is also known that a high degree of fill can be achieved by means of a bimodal distribution of the particle sizes in which the gaps between the coarse particles are filled by finer particles.

Shi and Zhang, Journal of the American Ceramic Society 83 (2000), 737, disclose a bimodal aluminium oxide dispersion using aluminium oxide powders having a particle diameter determined by transmission electron microscopy of 0.17, 0.37 and 0.86 μm. The dispersions are obtained by stirring two of these powders into water and subsequently setting the pH. The optimal proportion of an in each case finer aluminium oxide is about 30%, based on the sum of coarse and fine aluminium oxide, in order to obtain a still processable dispersion and a substantially dense green body. According to Shi and Zhang, the total aluminium oxide content can be up to 45% by volume. However, the sintering activity of the aluminium oxides remains in need of improvement.

Smith and Haber, Journal of the American Ceramic Society 78 (1995), 1737, disclose bimodal dispersions of aluminium oxide using an aluminium oxide powder having a mean particle size of more than 1 μm (85 parts) and one having a mean particle size of 0.4 μm (15 parts) and having a content of up to 50% by volume. Here too, the sintering activity of the aluminium oxides remains in need of improvement.

DE-A-19603584 discloses a dispersion of aluminium hydroxide for use in the paper industry. This dispersion contains a polyaluminium hydroxychloride as dispersant, as a result of which the degree of fill of the dispersion can be increased and the dispersion still always remains pumpable. A disadvantage of this dispersion is the quite low sedimentation stability, as evidenced in the examples.

It is therefore an object of the invention to provide aluminium oxide in a form which makes it possible to obtain stable, highly filled, low-viscosity dispersions containing aluminium oxide which has a high sintering activity on thermal treatment.

The invention provides an aqueous dispersion containing transition aluminium oxide as only solid and a dispersant, characterized in that the transition aluminium oxide is present in the form of aggregates of primary particles, the content of transition aluminium oxide in the dispersion is from 40 to 65% by weight, the aggregates in the dispersion have a mean aggregate diameter of less than 100 nm, the dispersant contains polyaluminium hydroxychloride, polyaluminium hydroxynitrate and/or polyaluminium hydroxysulphate, the dispersion has a pH of from 3 to 5.

This dispersion will hereinafter be referred to as transition aluminium oxide dispersion. Its properties such as viscosity and sedimentation stability do not change significantly over a period of at least one month. In general, no sedimentation is observed even over a period of 6 months.

The transition aluminium oxide present in the transition aluminium oxide dispersion includes chi-, kappa-, gamma-, delta- and theta-aluminium oxide. Apart from these crystalline constituents, small proportions of amorphous aluminium oxide can also be present. The dispersion contains only transition aluminium oxide as solid. The main constituent is preferably gamma-aluminium oxide, delta-aluminium oxide, theta-aluminium oxide or a mixture thereof. The transition aluminium oxide particularly preferably comprises at least 60% of a mixture of delta-aluminium oxide and theta-aluminium oxide. Alpha-aluminium oxide is not a constituent of the dispersion of the invention. The transition aluminium oxide is present in the form of aggregates of primary particles and preferably has a BET surface of from 20 to 150 m²/g. Particular preference can be given to a BET surface area of from 30 to 100 m²/g, very particularly preferably from 55 to 70 m²/g.

The transition aluminium oxide can preferably be obtained by a pyrogenic process. Such a process can be flame hydrolysis and/or flame oxidation. Here, organic or inorganic aluminium compounds, for example aluminium chloride, are reacted in the presence of steam and/or oxygen to form aluminium oxide. The resulting primary particles are not porous and have hydroxyl groups on their surface. In the case of a chloride-containing aluminium compound as starting material, the aluminium oxide can also contain small amounts of chloride, in general less than 0.1% by weight. The transition aluminium oxide dispersion is preferably produced using an aluminium oxide containing less than 300 ppm of chloride.

An important parameter of the transition aluminium oxide dispersion is the mean particle diameter in the dispersion. It is less than 100 nm, and can preferably assume values of from 70 to 90 nm. It can, for example, be determined by laser light scattering.

The pH of the transition aluminium oxide dispersion is from 3 to 5 preferably from 3.5 to 4.5. It can, if desired, be adjusted by addition of pH regulators, acids or bases. If aluminium chloride is used as starting material for preparing aluminium oxide, the pH can already be in the desired pH range as a result of adhering hydrochloric acid.

The dispersion of the invention contains a polyaluminium hydroxychloride (PAC), polyaluminium hydroxynitrate and/or polyaluminium hydroxysulphate as significant constituent, with the dispersion preferably containing polyaluminium hydroxychloride (PAC). This is a water-soluble salt of the formula $Al_n(OH)_mCl_{(3n-m)}$, for example $Al_2(OH)_{2.6}Cl_{3.4}$. The PAC preferably has an aluminium content of from 5 to 25% by weight, calculated as $Al_2O_3$.

A mixture of PAC with a cationic polymer and/or a cocondensation product of PAC and a cationic dicyandiamide resin has been found to be a particularly advantageous dispersant.

As cationic polymers, preference is given to using polyethylenimines, polydiallyldimethylammonium chlorides or cationic dicyandiamide resins.

The cationic dicyandiamide resins and their preparation are described, for example, in DE-A-3500408. The polyaluminium hydroxychloride and the cationic polymer are preferably present in a weight ratio of from 30:70 to 95:5.

The proportion of dispersant is preferably from 0.1 to 3% by weight, based on the total amount of the dispersion.

Furthermore, the dispersion of the invention can contain a cocondensation product of polyaluminium hydroxychloride and a cationic dicyandiamide resin as constituent. These cocondensation products and their preparation are known from DE-A-3742764. The ratio of PAC to cationic dicyandiamide resin in this cocondensation product can likewise be varied within wide limits, but a molar ratio of aluminium to dicyandiamide of from 15:1 to 2:1 is preferred.

Compounds of the general formula A in which $R=CONH_2$, CN or H; $X=Cl^-$, $\frac{1}{2}SO_4^{2-}$ and $n=5-15$ are particularly suitable as constituents of the dispersion of the invention.

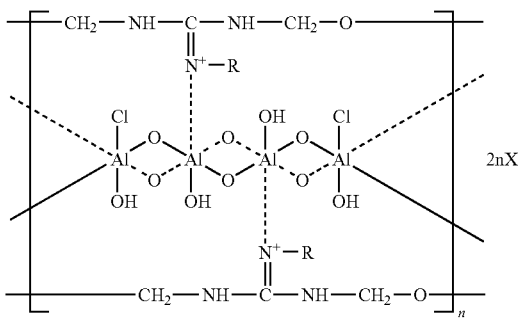

The invention further provides a process for producing the transition aluminium oxide dispersion, in which, if appropriate, one or more additives are placed in water, aluminium oxide powder is added all at once, in portions or continuously and the mixture is dispersed by introduction of energy of more than 1000 kJ/m³.

The process can preferably be carried out with dispersion firstly being carried out at an energy input of less than 1000 kJ/m³ to form a predispersion, dividing the predispersion into at least two substreams, placing these substreams under a pressure of at least 500 bar in a high-energy mill, depressurizing via a nozzle and allowing the substreams to impinge on one another in a gas- or liquid-filled reaction space and, if appropriate, repeating the high-energy milling one or more times.

The transition aluminium oxide dispersion can be a constituent of a dispersion which additionally contains one or more metal oxides selected from the group consisting of alpha-aluminium oxide, cerium oxide, silicon dioxide, titanium dioxide or zirconium dioxide as solid. This dispersion will be referred to as mixed oxide dispersion. In this, the total content of metal oxide and transition aluminium oxide is generally from 60 to 75% by weight and the content of transition aluminium oxide is from 30 to 45% by weight, in each case based on the total amount of the dispersion. The term metal oxide is to be interpreted as excluding transition aluminium oxides and including silicon dioxide as metalloid oxide. The mean particle diameter of the metal oxide is from 100 to 500 nm and thus greater than that of the transition aluminium oxide. In general, the particle diameter of the metal oxide is from 200 to 400 nm. The metal oxide particles can be present in the form of aggregated or unaggregated particles. Alpha-aluminium oxide, which usually has a BET surface area of from 5 to 20 m²/g, is mostly used.

The transition aluminium oxide dispersion can be used for producing ceramic bodies.

EXAMPLES

Transition Aluminium Oxide Dispersion

Example 1

According to the Invention 37 kg of deionized water and 460 g of ALZOFIX® P9 (a PAC-dicyandiamide cocondensation product, Degussa AG) are placed in a 60 l stainless steel mixing vessel. 25 kg of AEROXIDE® Alu 65 (pyrogenic aluminium oxide, BET=65 m²/g, main constituents: theta- and delta-aluminium oxide; Degussa AG) are subsequently sucked in under shear conditions by means of an Ystral Conti-TDS 3 suction hose (stator slits: 4 mm ring and 1 mm ring, rotor/stator spacing about 1 mm). A further 340 g of ALZOFIX are then added and 5 kg of AEROXIDE® Alu 65 are sucked in. This alternating addition is carried out a total of 6 times. After the addition is complete, the intake port is closed and shear is applied at 3000 rpm for another 20 minutes. Finally, the predispersion is brought to a content of 55% by weight by means of 5.5 kg of deionized water and sheared once more for a further period of about 5 minutes to homogenize it. This predispersion is passed through a Sugino Ultimaizer HJP-25050 high-energy mill having diamond nozzles having a diameter of 0.3 mm at a pressure of 2500 bar in two passes and thereby subjected to further intensive milling.

The pH is 4.1. The solids content of the dispersion is 55% by weight. The mean aggregate diameter is 83 nm (determined by means of a Horiba LA-910). The zeta potential of the dispersion is +43 mV at a conductivity of 0.16 S/m. The dispersion displays no signs of gelling or sedimentation even after 6 months.

Example 2

Analogous to Example 1 but using AEROXIDE® Alu C (pyrogenic aluminium oxide, BET=100 m²/g, main constituent: gamma-aluminium oxide, Degussa) instead of AEROXIDE® Alu 65.

The pH is 4.1. The solids content of the dispersion is 55% by weight. The mean aggregate diameter is 79 nm (determined by means of a Horiba LA-910). The dispersion displays no signs of gelling or sedimentation even after 6 months.

Example 3

Comparative Example

Analogous to Example 1 but using 50% strength acetic acid in water instead of ALZOFIX. The acetic acid is added in a manner analogous to ALZOFIX in 2 portions of 0.9 kg and 1.0 kg.

The dispersion displays significant sedimentation after a few days.

Mixed Oxide Dispersion

Example 4

550 g of the dispersion from Example 1 are placed in a vessel. While stirring by means of a laboratory stirrer, 155 g of alpha-aluminium oxide powder (AKP-50, Sumitomo, mean particle size about 200 nm) are added.

Examples 5 and 6

Analogous to Example 4 but using the amounts indicated in Table 1.

As shown in Table 1, the dispersion according to the invention is ideally suited for producing highly filled dispersions as starting materials for ceramic materials. The mixed oxide dispersions produced in this way still have good processibility even at a very high degree of fill. They can be produced by simple stirring of the metal oxide into the transition aluminium oxide dispersion.

TABLE 1

Starting materials for producing the mixed oxide dispersions

| Example | | 4 | 5 | 6 |
|---|---|---|---|---|
| Transition $Al_2O_3$ dispersion from Example | | 1 | 1 | 1 |
| Amount of dispersion | g | 550 | 550 | 550 |
| of which transition $Al_2O_3$ | g | 302.5 | 302.5 | 302.5 |
| conc. of transition $Al_2O_3$ | % by weight | 55 | 55 | 55 |
| +alpha-$Al_2O_3$ | g | 155 | 247.3 | 315.3 |
| +hydrochloric acid (1 M) | g | — | 29.3 | 29.3 |
| Total amount of mixed oxide dispersion | g | 705 | 826.6 | 894.6 |
| Conc. of transition $Al_2O_3$ | % by weight | 43 | 37 | 34 |
| Conc. of alpha-$Al_2O_3$ | % by weight | 22 | 30 | 35 |
| Conc. of total $Al_2O_3$ | % by weight | 65 | 67 | 69 |
| pH | | 4.03 | 3.35 | 3.58 |
| Observation | | readily pourable | readily pourable | readily pourable |

The invention claimed is:

1. Aqueous dispersion comprising transition aluminium oxide as only solid and a dispersant, characterized in that wherein
    the transition aluminium oxide is present in the form of aggregates of primary particles, the content of transition aluminium oxide in the dispersion is from 40 to 65% by weight, the aggregates in the dispersion have a mean aggregate diameter of less than 100 nm,
    the dispersant comprises polyaluminium hydroxychloride, polyaluminium hydroxynitrate and/or polyaluminium hydroxysulphate,
    the dispersion has a pH of from 3 to 5, and
    wherein alpha-aluminium oxide is excluded from the dispersion.

2. Aqueous dispersion according to claim 1, wherein the BET surface area of the transition aluminium oxide is from 20 to 150 $m^2/g$.

3. Aqueous dispersion according to claim 1, wherein the transition aluminium oxide contains theta- and/or delta-aluminium oxide as main constituent.

4. Aqueous dispersion according to claim 1, wherein the dispersant is polyaluminium hydroxychloride, a mixture of polyaluminium hydroxychloride and a cationic polymer and/or a cocondensation product of polyaluminium hydroxychloride and a cationic dicyandiamide resin.

5. Aqueous dispersion according to claim 1, wherein the proportion of dispersant is from 0.1 to 3% by weight, based on the total amount of the dispersion.

6. Process for producing the aqueous dispersion according to claim 1, comprising placing the dispersant in water, adding transition aluminium oxide all at once, in portions or continuously and dispersing the mixture by introduction of energy of more than 1000 $kJ/m^3$.

7. Process according to claim 6, wherein the dispersion is firstly carried out at an energy input of less than 1000 $kJ/m^3$ to form a predispersion, the predispersion is divided into at least two substreams, these substreams are placed under a pressure of at least 500 bar in a high-energy mill, depressurized via a nozzle and the substreams are allowed to impinge on one another in a gas- or liquid-filled reaction space and the high-energy milling is repeated one or more times.

8. A method comprising producing a further dispersion or producing a composite comprising from the aqueous dispersion containing aluminium oxide according to claim 1.

9. Aqueous dispersion according to claim 1, wherein the pH is 3.5 to 4.5.

10. Aqueous dispersion according to claim 1, wherein the mean aggregate diameter is 70 to 90 nm.

11. Aqueous dispersion according to claim 2, wherein the BET surface area is from 30 to 100 $m^2/g$.

12. Aqueous dispersion according to claim 2, wherein the BET surface area is from 55 to 70 $m^2/g$.

13. Aqueous dispersion according to claim 4, wherein the dispersant comprises a cocondensation product of polyaluminium hydroxychloride and a cationic dicyandiamide resin.

14. Aqueous dispersion according to claim 13, wherein the polyaluminium hydroxychloride and the cationic dicyandiamide resin are present in a molar ratio of from 15:1 to 2:1.

15. Aqueous dispersion according to claim 1, which displays no signs of gelling or sedimentation for at least one month after preparation.

16. Aqueous dispersion according to claim 1, which displays no signs of gelling or sedimentation for at least 6 months after preparation.

* * * * *